Aug. 6, 1940.  W. E. HODGKIN  2,210,292
COUPLING DEVICE
Filed Oct. 6, 1939
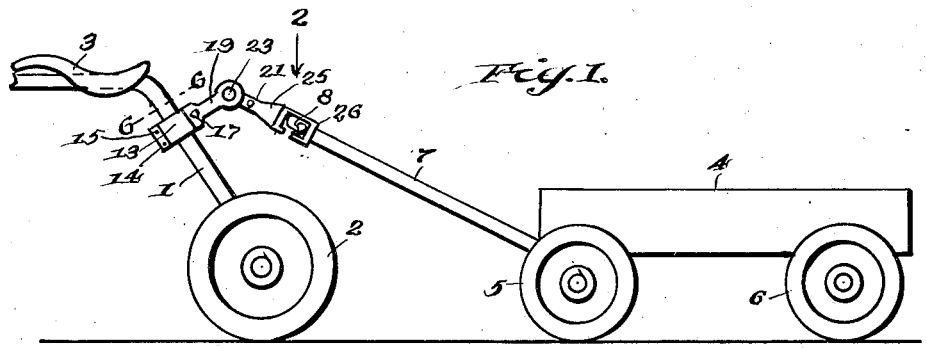
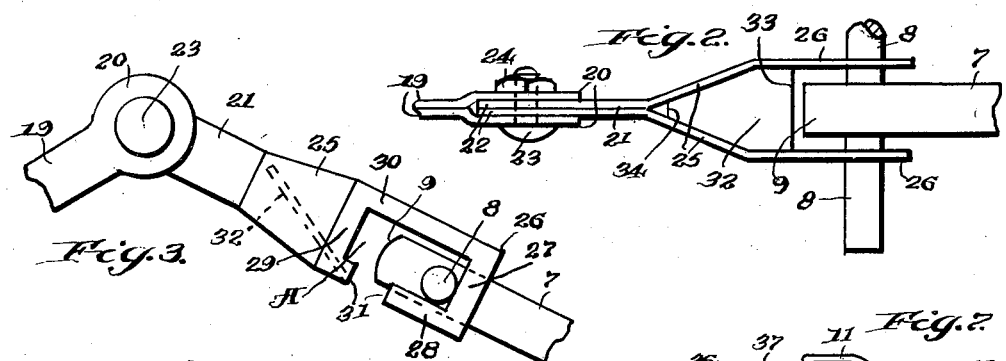
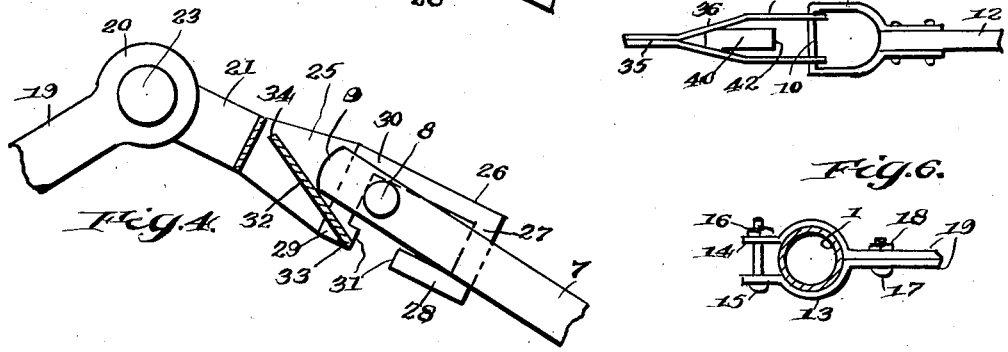
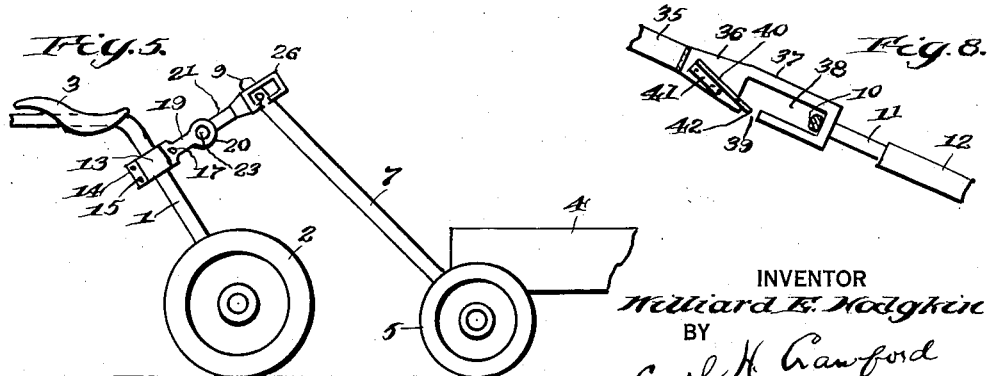
INVENTOR
Williard E. Hodgkin
BY
Carl H. Crawford
ATTORNEY Patented Aug. 6, 1940

2,210,292

UNITED STATES PATENT OFFICE 2,210,292

COUPLING DEVICE

Williard E. Hodgkin, Spokane, Wash.

Application October 6, 1939, Serial No. 298,236

3 Claims. (Cl. 280—204)

This invention relates to an improved coupling device for coupling a trailer to a bicycle, tricycle, velocipede or like child propelled vehicle.

A typical trait of most all small children when propelling such a vehicle is to want to haul something, and a wagon having a tongue, is the most usual type of trailer selected. It is always a problem to find ways and means for coupling the wagon tongue in trailing relation to the vehicle being propelled because of the lack of suitable equipment. Because of the very irregular manner in which children play with such vehicles, in the matter of stopping, starting and turning, it is necessary to provide a device for this purpose which is especially constructed to meet such requirements, and which at the same time, is of low cost and of the greatest simplicity.

It is a feature of this invention to provide a coupling device that can readily be applied to portions of such vehicles as bicycles and the like, irrespective of the widely different forms and sizes thereof, so that the device can be sold independently of such vehicles as an accessory therefor, as well as a part of the original equipment thereof.

Because of the difference in height of such vehicles, and by reason of the fact that children's wagons are almost always relatively low in height, the draft pull will practically always be in a line of downward inclination from the propelled vehicle to the trailer, and it is a feature of this invention to provide a coupling device which can readily be adjusted in accordance with the required draft angle.

In order to avoid the necessity of auxiliary movable parts, it is a feature of this invention to provide a coupling device or member having a lost motion draft coupling connection with a wagon tongue and which will act, both under draft pull, and when the vehicle stops, in the former case to pull, and in the latter case to arrest the trailer, and still form a draft connection.

It is a feature to provide the coupling member with means for preventing un-coupling of the tongue therefrom when the coupling member is in a draft adjustment, and to so construct said coupling member that when it is adjusted into an un-coupling or coupling position, the tongue can readily be coupled or uncoupled.

The invention has many other features which will be more fully described in connection with the accompanying drawing and which will be more particularly pointed out in and by the appended claims.

In the drawing:

Fig. 1 is a view in side elevation of the rear end of a velocipede, with the device of my invention applied thereto, and showing the same in a draft or pulling connection with a trailer wagon.

Fig. 2 is a fragmentary plan view on an enlarged scale showing the coupling member and a portion of a tongue connected therewith.

Fig. 3 is a view in side elevation showing the coupling member in draft connection with the tongue.

Fig. 4 is a view similar to Fig. 3, with parts broken away, showing how the tongue is prevented from being accidently un-coupled when the velocipede is stopped or backed-up.

Fig. 5 is a view similar to Fig. 1, showing how the coupling member is adjusted out of a draft or pulling position into a coupling or un-coupling position.

Fig. 6 is a sectional view on an enlarged scale, taken on line 6—6 of Fig. 1.

Fig. 7 is a plan view on a reduced scale, showing a modified form of the device.

Fig. 8 is a view in side elevation thereof with parts broken away.

Like characters of reference designate similar parts throughout the different figures of the drawing.

As illustrated, the rear end of a child propelled velocipede is shown as having a frame portion 1, a rear wheel 2 and a seat 3. A child's wagon is shown as the trailing vehicle and has a box 4, front and rear wheels 5 and 6, respectively, and a tongue 7. The tongue 7 is provided with a handle member or a set of cross pins which may be in the form of a rod 8, that projects in opposite directions from lateral sides of tongue 7, and which is located slightly in the rear of the projecting free end 9, of the tongue. Such tongues are practically always equipped with some kind of a handle member and it is usually of the form shown, but in some types, it is of the loop form, as shown in Figs. 7 and 8, wherein the laterally extending member is designated at 10, and forms a part of side members 11, which are attached to the tongue 12.

Reference will next be made to the improved draft means whereby the coupling member is connected with the propelled vehicle, and I will refer more particularly to Figs. 1 to 6.

As shown, said draft means includes a clamp which may take the form of strips 13, shaped to embrace frame member 1, and provided with substantially parallel ends 14, through which one or more clamping bolts 15, may extend, the latter having nuts 16. A bolt 17, having a nut 18, may extend through abutting portions of the strips on the remaining side of frame 1, as shown in Fig. 6. Said strips, as shown at 19, extend outwardly from the clamp proper, and form what I will term a draft bar, the ends 20, being spaced apart to accommodate another portion of the device, next to be described.

Reference will next be made to the improved coupling member as shown in Figs. 1 to 5.

As shown, said member is formed of two strips suitably united, and forming what I will term a coupling bar 21. The inner end of said bar 21 may be shaped to form circular connecting portions 22, adapted to be disposed between parts 20, and a pivot bolt 23, having a nut 24, forms a pivotal connection between the draft bar and coupling bar, and as the pivot is substantially horizontally disposed, the coupling bar may be adjusted into various positions in a vertical plane, as will later appear. In practice, the bolt 23, is tightened to such an extent that friction will tend to hold the coupling bar in its adjusted position although this is not an essential requirement.

The strips forming bar 21, have diverging sections 25, and said strips extend beyond said sections and form what I will term coupling frames 26, which are disposed in substantially parallel relation and which are spaced apart sufficiently to straddle the tongue 7, and provide for considerable play, irrespective of the varying cross section of tongues with which these wagons are equipped.

Each coupling frame is fashioned or provided with an elongated coupling opening adapted loosely to encircle the handle member 8, and as both frames are identical, only one need be described in detail.

The coupling opening is indicated at A, and in the present construction, the same is bordered by angularly disposed rear and lower handle engaging draft frame members 27 and 28, respectively, and angularly disposed front and upper handle arresting frame members 29 and 30, respectively. The lower frame member 28, is interrupted at 31, to form a handle entrance ways through which the handle 8, may be moved into and out of coupling relation with said coupling member, as will later appear. It will be noted that these entrance ways 31, in frame members 28, are disposed in the lower portion of the coupling member, and forwardly with respect to the direction of draft.

The openings A, are shown as rectangular, but essentially, they may be broadly termed as elongated, and are sufficiently large with respect to the handle member 8, so that the latter can move freely therein. Because the openings A, are elongated, the handle 8, has an unrestrained lost motion draft connection with the coupling member, the purpose of which will later appear. In addition to this lost motion connection, the tongue, as previously stated, is loosely disposed between frames 26 and has considerable play therebetween.

In the present construction, the entrance ways 31, are located substantially in advance of the rear frame members 27, so that when handle 8, is in a draft position, as shown in Fig. 3, the entrance ways 31 will be substantially in advance of said handle 8.

When draft slackens, or in backing up, the tongue 7, would advance from the Fig. 3 to the Fig. 4, position, and if it were not for the means provided, the handle 8 would descend through the entrances 31, and the tongue 7 would become un-coupled from the coupling member. I will next describe the means for preventing such accidental un-coupling of the tongue.

A retaining cam 32, is disposed and suitably secured, as by welding or otherwise, between and to the diverging sections 25, in advance of said openings so that it will not only function as a cam, but also as a stiffening element for the diverging sections. The lower end 33, of said cam is disposed slightly below the tops of the lower frame members 28, so as to be below the line of travel of handle 8, and said lower end is slightly in advance of the entrance ways 31, as shown in Fig. 4. The upper end 34, is located near the top of the diverging sections 25, so that the practical extent of inclination can be seen from Fig. 4.

In the event that the tongue is provided with a loop form of handle, as shown in Figs. 7 and 8, and is not provided with a forward projection comparable with the free end 9, of tongue 7, then my invention contemplates a form of coupling member that will accommodate such loop form of handle.

I have therefore shown a coupling bar 35, provided with diverging sections 36, which terminate in coupling frame members 37, that are disposed in substantially parallel relation, as shown in Fig. 7, but which do not straddle the tongue 12. Said frame members 37, are provided with elongated slots 38, similar to the elongated slots A in members 26, with entrances 39, through which the handle member 10, may be inserted or withdrawn into or out of coupling relation with the members 37, as will now be clear. When handle 10, is in a draft relation to members 37, it will engage the far end of slot 38, as shown in Fig. 8. In order to prevent said handle from accidentally descending through entrance ways 39, when the vehicle is stopped or backed up, I provide a retaining cam 40, secured at 41, to diverging sections 36, and the lower free end 42, intersects the entrance ways 39, and this cam 40, will be formed of slightly resilient material so that the free end 42, will yield under pressure.

While the operation may be clear from the foregoing description, it will be briefly recapitulated as follows:

In the Fig. 1, position, the coupling member is inclined from the draft bar 19, into the line of draft of the particular wagon shown. Thus it will be seen that the pivotal connection affords a wide range of use of the coupling member to practically any form or size of trailer. When the parts are in a draft or pulling relation, as shown in Figs. 1 and 3, the handle 8, is disposed rearwardly of the entrances 31, and cannot descend therethrough and cause accidental uncoupling of the tongue 7. However, when slackening the pull, or when backing up, the tongue 7 will of course slide forwardly or to the left of Fig. 3, as shown in Fig. 4. Then, the free end 9, of the tongue 7, which is in advance of handle 8, will engage cam 32, and slide upwardly thereon, and this will shift the handle transversely of the coupling openings and elevate handle 8, above entrance ways 31, and prevent un-coupling. It will be seen that when handle 8, reaches the Fig. 4, position, it will engage the front and upper frame members 29 and 30, respectively, and will be arrested thereby, so that the tongue 7 cannot advance farther than shown in Fig. 4. This arresting thrust, as well as the pulling or draft thrust on the rear frame member 27, is substantially in line with the bar 21, and hence these opposite thrusts will not tend to shift the coupling member out of its draft adjustment. Further, after a draft pull is initiated, from the Fig. 4 position, the handle 8 will be retained above frame member 28, until said handle 8 has passed to the right of entrance ways 31, so that in no event can the tongue be un-coupled from the coupling member when the same is in a draft adjustment.

Next referring to the modified form shown in Figs. 6 and 7, it will be clear that the operation will be substantially the same except that the lower end 42, of cam 40, extends into the entrances 39, transversely considered, or in other words, into the transverse area of said entrances, although as shown in Fig. 7, said cam is narrower than the frame members 37. Thus, in backing up, or slowing up of the propelling vehicle, the handle member 10, will advance in slot 38, and ride up on cam 40, until it reaches the left hand end of said slot, viewing Fig. 8. Thus, it will be impossible for the handle 10 to become un-coupled from said coupling member. However, if it is desired to un-couple the tongue, the latter can be moved up until the handle member 10, reaches entrances 39, and then it can be forced downwardly, and the flexible right hand end of cam 40, will yield to permit the handle to pass out through said entrances, or in through said entrances, when it is desired to make a coupling connection. Thus, coupling and un-coupling engagements, in this form of the invention, can be made without shifting the coupling member from the position shown in Fig. 8.

It will be seen that the parts 29, of the coupling, form the handle member arresting ends of the coupling openings while the parts 27, form the handle member draft ends of said openings. When the coupling member and tongue are in a draft position, as shown in Figs. 3 and 8 said handle member, whether in the form shown in Figs. 1 to 5, or as shown in Figs. 7 and 8, will have free and unrestrained lost motion coupling connection with the coupling member. Further, when the handle member or tongue is engaged, or in the specific forms shown, elevated by the cams, the handle members will be shifted transversely of the length of said coupling openings as shown in Fig. 4, and the openings are made sufficiently large transversely of their length, with respect to the cross section of the handle members, so that the latter can be shifted transversely of said openings.

The importance of a loose connection between the coupling member and the tongue to permit turning movement, will now be clear, and the lost motion draft connection is not only important in providing for easy coupling and un-coupling, but it permits the rider of the propelled vehicle to slacken speed or stop, without a too sudden forward jolt from the trailing vehicle, since the speed of travel, with children, does not permit of the trailer acquiring a great deal of momentum.

While I have shown specific forms of the invention, I do not wish to be limited thereto except for such limitations as the claims may import.

I claim:

1. A coupling device for a child propelled vehicle and a trailer having a tongue provided with laterally projecting handle members located rearwardly from the free end of the tongue, comprising a clamp for attachment to the vehicle and provided with a draft bar, a coupling member comprising a coupling bar having one end pivoted to said draft bar for adjustment of said coupling member into un-coupling or draft positions, the remaining end of said coupling member having spaced apart coupling frames adapted loosely to straddle said tongue and said frames each having a coupling opening for encircling a handle member and said openings being of elongated form with rear handle member draft ends and front handle member arresting ends to permit of unrestrained lost motion of said handle members longitudinally in said openings when said coupling member and tongue are in a draft position, and said openings being enlarged transversely of their length with respect to the cross section of said handle members to permit movement of the latter transversely of the length of said openings, said frames being interrupted near said arresting ends of said openings to form entrance ways for passage of said handle members into and out of said coupling openings when said coupling member is in an un-coupling position, and said coupling member having a rigid cam disposed between said frames and substantially forwardly of said openings for engaging the free end of the tongue to elevate the latter and shift said handle members transversely of said openings and above said entrance ways when backing up or when draft pull slackens to prevent accidental uncoupling of the tongue when said coupling member is in a draft position.

2. A coupling device for a child propelled vehicle and a trailer having a tongue provided with a handle member, comprising a coupling member adjustably connected with the vehicle to be shifted into an un-coupling or draft position and comprising spaced apart coupling frames adapted to straddle the tongue and said frames each having a coupling opening for encircling the handle member and said openings being of elongated form with rear handle member draft ends and front handle member arresting ends to permit lost motion movement of said handle member longitudinally in said openings when said coupling member and tongue are in a draft position, said frames having entrance ways for passage of said handle member into and out of said coupling openings when said coupling member is in an un-coupling position, and said coupling member having a cam for engaging the tongue to sustain the latter and prevent said handle member from passing outwardly through said entrance ways and accidentally un-coupling the tongue when backing up or when draft pull slackens.

3. A coupling device for a child propelled vehicle and a trailer having a tongue provided with a handle member, comprising a coupling member adjustably connected with the vehicle to be shifted into an un-coupling or draft position and comprising spaced apart coupling frames adapted to straddle the tongue and said frames each having a coupling opening for encircling the handle member and said openings being of elongated form to permit lost motion movement of said handle member longitudinally in said openings when said coupling member and tongue are in a draft position, said frames having entrance ways for passage of said handle member into and out of said openings, and said coupling member having means for preventing said handle member from passing outwardly through said entrance ways and accidentally un-coupling said tongue while backing up or when draft pull slackens.

WILLIARD E. HODGKIN.